(12) United States Patent
Kotecha et al.

(10) Patent No.: US 8,850,008 B2
(45) Date of Patent: Sep. 30, 2014

(54) USER DEVICE APPLICATION MONITORING AND CONTROL

(75) Inventors: Lalit R. Kotecha, San Ramon, CA (US); Deepak Kakadia, Union City, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 133 days.

(21) Appl. No.: 13/302,305

(22) Filed: Nov. 22, 2011

(65) Prior Publication Data

US 2013/0132559 A1 May 23, 2013

(51) Int. Cl.
| | |
|---|---|
| G06F 15/173 | (2006.01) |
| H04L 12/923 | (2013.01) |
| H04L 12/859 | (2013.01) |
| H04L 12/26 | (2006.01) |
| H04L 12/813 | (2013.01) |
| H04L 12/927 | (2013.01) |
| G06F 11/34 | (2006.01) |

(52) U.S. Cl.
CPC ............ *H04L 47/20* (2013.01); *G06F 11/3409* (2013.01); *H04L 47/762* (2013.01); *H04L 47/2475* (2013.01); *H04L 43/0876* (2013.01); *H04L 43/16* (2013.01); *H04L 47/803* (2013.01); *G06F 11/3466* (2013.01)
USPC ........................................................ 709/225

(58) Field of Classification Search
CPC ......... H04L 12/14; H04L 67/04; H04L 67/34; H04W 4/24; H04W 4/26
USPC .................................................. 709/224, 225
See application file for complete search history.

(56) References Cited

U.S. PATENT DOCUMENTS

| | | | | |
|---|---|---|---|---|
| 6,112,236 | A * | 8/2000 | Dollin et al. ................... | 709/224 |
| 6,141,686 | A * | 10/2000 | Jackowski et al. ............. | 709/224 |
| 6,195,697 | B1 * | 2/2001 | Bowman-Amuah .......... | 709/224 |
| 6,442,547 | B1 * | 8/2002 | Bowman-Amuah ..... | 379/221.14 |
| 6,542,593 | B1 * | 4/2003 | Bowman-Amuah ..... | 379/201.03 |
| 6,556,659 | B1 * | 4/2003 | Bowman-Amuah ......... | 379/9.04 |
| 6,578,077 | B1 * | 6/2003 | Rakoshitz et al. ............. | 709/224 |
| 6,611,867 | B1 * | 8/2003 | Bowman-Amuah .......... | 709/224 |
| 7,106,756 | B1 * | 9/2006 | Donovan et al. .............. | 370/468 |
| 7,765,294 | B2 * | 7/2010 | Edwards et al. ............... | 709/224 |
| 7,957,991 | B2 * | 6/2011 | Mikurak ....................... | 705/7.11 |
| 8,213,951 | B2 * | 7/2012 | Brisebois et al. ........... | 455/452.2 |
| 8,233,449 | B2 * | 7/2012 | Agulnik et al. ................ | 370/330 |
| 8,307,065 | B2 * | 11/2012 | McNaughton et al. ........ | 709/224 |
| 8,346,225 | B2 * | 1/2013 | Raleigh ....................... | 455/414.1 |
| 8,374,090 | B2 * | 2/2013 | Morrill et al. ................. | 370/235 |
| 8,484,568 | B2 * | 7/2013 | Rados et al. ................... | 715/745 |
| 8,493,870 | B2 * | 7/2013 | Calippe et al. ................ | 370/242 |
| 8,531,945 | B2 * | 9/2013 | Chandrachood et al. ...... | 370/229 |
| 8,589,541 | B2 * | 11/2013 | Raleigh et al. ................ | 709/224 |
| 8,606,911 | B2 * | 12/2013 | Raleigh et al. ................ | 709/224 |
| 8,612,582 | B2 * | 12/2013 | Dare et al. ..................... | 709/224 |

(Continued)

*Primary Examiner* — Kevin Bates
*Assistant Examiner* — Clarence D McCray (57) ABSTRACT

A system receives traffic information that identifies an application installed on a user device and resources being used to process traffic associated with the application; obtains, as a result of receiving the traffic information, a policy that identifies a particular amount of resources authorized for processing particular traffic associated with the application; determines that an amount of the resources being used to process the traffic exceeds the particular amount of resources authorized for processing the particular traffic; and transmits a notification to cause the traffic to be controlled by a base station to reduce the amount of the resources to a level less than the particular amount of resources.

21 Claims, 7 Drawing Sheets

(56) References Cited

U.S. PATENT DOCUMENTS

| | | | |
|---|---|---|---|
| 8,615,581 B2* | 12/2013 | Dare et al. | 709/224 |
| 8,650,290 B2* | 2/2014 | Dare et al. | 709/224 |
| 2004/0160922 A1* | 8/2004 | Nanda et al. | 370/335 |
| 2007/0140123 A1* | 6/2007 | Fukui | 370/235 |
| 2008/0052393 A1* | 2/2008 | McNaughton et al. | 709/224 |
| 2008/0052394 A1* | 2/2008 | Bugenhagen et al. | 709/224 |
| 2008/0310485 A1* | 12/2008 | Soliman et al. | 375/147 |
| 2009/0106571 A1* | 4/2009 | Low et al. | 713/310 |
| 2011/0188457 A1* | 8/2011 | Shu et al. | 370/329 |
| 2012/0036220 A1* | 2/2012 | Dare et al. | 709/217 |
| 2012/0036245 A1* | 2/2012 | Dare et al. | 709/223 |
| 2012/0054661 A1* | 3/2012 | Rados et al. | 715/772 |
| 2012/0101952 A1* | 4/2012 | Raleigh et al. | 705/304 |
| 2012/0129517 A1* | 5/2012 | Fox et al. | 455/425 |
| 2012/0144057 A1* | 6/2012 | Meredith et al. | 709/232 |
| 2012/0221955 A1* | 8/2012 | Raleigh et al. | 715/736 |
| 2013/0132854 A1* | 5/2013 | Raleigh et al. | 715/238 |
| 2013/0229934 A1* | 9/2013 | Brisebois et al. | 370/252 |
| 2014/0024361 A1* | 1/2014 | Poon et al. | 455/419 |
| 2014/0098671 A1* | 4/2014 | Raleigh et al. | 370/235 |

* cited by examiner

USER DEVICE APPLICATION MONITORING AND CONTROL

BACKGROUND

User devices perform an increasing variety of tasks that allows users to make and receive calls, send and receive messages (e.g., emails, instant messages, etc.), surf the Internet, play games, make electronic purchases, perform social networking, etc. Many of the tasks are performed using applications that are installed on and executed by the user devices. The applications may communicate with a network to transmit and/or receive information, such as to update the application, obtain information for use by the application when executing, to provide information about the user device, etc.

Unfortunately, the applications may communicate with the network without the knowledge and/or authorization of the users. This may cause data usage, associated with the user devices, to become greater than a threshold specified by agreements between the users and service providers associated with the network. Additionally the applications may use network resources, such as bandwidth, processing capacity, etc., when communicating with the network. The quantity of resources used by the applications may cause service providers to expend resources to increase network capacity so that services can be provided to the users at a particular quality of service and/or to avoid congestion on the network.

DETAILED DESCRIPTION OF PREFERRED EMBODIMENTS

The following detailed description refers to the accompanying drawings. The same reference numbers in different drawings may identify the same or similar elements.

A system and/or method, described herein, may allow a server device to monitor and/or control a flow of traffic, associated with an application that is installed on a user device, based on an application policy that is set up by a user of the user device. The server device may control the flow by causing an amount of resources, associated with the flow, to be decreased to a level that is less than a threshold identified by the application policy. The server device may control the flow by terminating the flow when the application policy does not permit the application to communicate with the network. The server device may control the flow by allocating an amount of resources, associated with the flow, to provide a particular quality of service (QoS) based on a service that is subscribed to by the user (e.g., at a particular cost) and an application policy associated with the service. The server device, by enforcing the application policy, may enable the user device to use the application while conforming to an agreement between the user and a service provider associated with the network.

A system and/or method, described herein, may allow a server device to monitor and/or control traffic, associated with one or more applications installed on user devices within the network, based on a network policy that is specified by an operator of the server device. The server device may cause the traffic bandwidth, data rate, etc. to be controlled when the network policy indicates that the traffic is to be curtailed. Curtailing the traffic may allow the network to operate without becoming congested and/or may permit a quality of service (QoS) to be delivered to users that have subscribed to a particular QoS.

Figure 1:
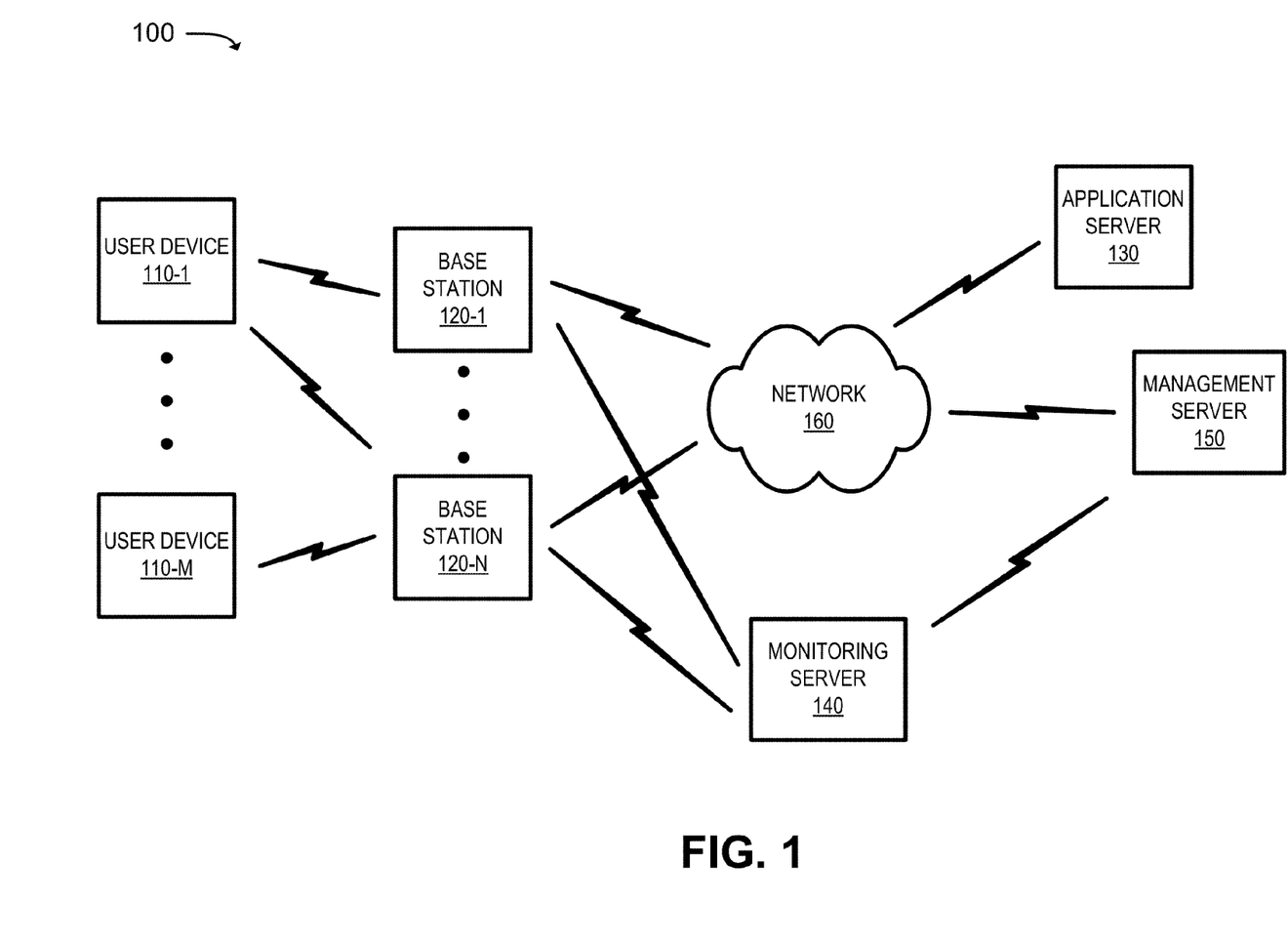
FIG. 1 is a diagram of an example environment in which systems and/or methods described herein may be implemented.

FIG. 1 is a diagram of an example environment 100 in which systems and/or methods described herein may be implemented. As shown in FIG. 1, environment 100 may include a group of user devices 110-1, . . . , 110-M (where M≥1) (hereinafter referred to collectively as "user devices 110" and individually as "user device 110"), a group of base stations 120-1, . . . , 120-N (where N≥1) (hereinafter referred to collectively as "base stations 120" and individually as "base station 120"), an application server 130, a monitoring server 140, a management server 150, and a network 160. The number of devices, servers, and/or networks, illustrated in FIG. 1, is provided for explanatory purposes only. In practice, there may be additional devices, servers, and/or networks; fewer devices, servers, and/or networks; different devices, servers, and/or networks; or differently arranged devices, servers, and/or networks than illustrated in FIG. 1.

Also, in some implementations, one or more of the devices and/or servers of environment 100 may perform one or more functions described as being performed by another one or more of the devices and/or servers of environment 100. For example, monitoring server 140 and/or management server 150 may be combined into a single device. Devices of environment 100 may interconnect via wired connections, wireless connections, or a combination of wired and wireless connections.

User device 110 may include a device that is capable of communicating with base station 120. For example, user device 110 may include a desktop computer, a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, a tablet computer, a camera, a personal gaming system, a smart phone, or another type of computation and/or communication device.

User device 110 may download an application from application server 130. User device 110 may register the application with management server 150. User device 110 may, when registering the application, set up user preferences associated with an application policy to be used to monitor and/or control traffic associated with the application.

Base station 120 may include one or more devices that receive, process, and/or transmit traffic, such as voice, video, text, and/or other data, destined for and/or received from user device 110. In an example implementation, base station 120 may be an eNodeB (eNB) associated with a long term evolution (LTE) radio access network (RAN), based on a Third Generation Partnership Project (3GPP) standard that receives traffic from and/or sends traffic to network 160. In another example implementation, base station 120 may be an evolved high rate packet data (eHRPD)-based device associated with a RAN. In yet another example implementation, base station 120 may be a wireless access point (e.g., a Wifi hotspot, a wireless router, etc.). Base station 120 may receive traffic from and/or send traffic to network 160. Base station 120 may send traffic to and/or receive traffic from user device 110 via an air interface.

Application server 130 may include one or more server devices, or other types of computation and/or communication devices, that gather, process, search, store, and/or provide information in a manner described herein. Application server 130 may, in one example, store one or more applications. Application server 130 may also, or alternatively, receive a request, from user device 110, to download an application and may transmit the application to user device 110 in response to the request. Additionally, or alternatively, application server 130 may send a notification, to management server 150, indicating that the application has been downloaded by user device 110.

Monitoring server 140 may include one or more server devices, or other types of computation or communication devices, that gather, process, search, store, and/or provide information in a manner similar to that described herein. Monitoring server 140 may, for example, monitor traffic being transported via cells associated with one or more base stations 120 to dynamically obtain traffic information associated with the traffic being transported via the one or more base station 120. The traffic information may identify user device 110 with which the traffic is associated, an application and/or flow associated with the traffic, base station 120 via which the traffic is being transported to and/or from user device 110, and/or information associated traffic conditions on the identified base station 120 (e.g., a quantity of bandwidth, a data rate, a processing capacity, etc. associated with traffic being processed by base station 120).

Management server 150 may include one or more server devices, or other types of computation and/or communication devices, that gather, process, search, store, and/or provide information in a manner described herein. Management server 150 may communicate with user device 110 to register an application that has been downloaded to user device 110. Management server 150 may allow the user, of user device 110, to set up an application policy associated with the downloaded application. The application policy may allow management server 150 to manage and/or control traffic, associated with the application, when the application is installed and/or executing on user device 110.

Management server 150 may allow the user, of user device 110, to set up an application policy associated with the downloaded application. The application policy may allow management server 150 to manage and/or control traffic, associated with the application, when the application is installed and/or executing on user device 110. Management server 150 may, for example, communicate with base station 120 via which the traffic is being transported to control the traffic based on the application policy.

Also, or alternatively, management server 150 may allow an operator, associated with management server 150, to set up a network policy to be used to manage and/or control traffic associated with one or more applications that are installed and/or executing on one or more user devices 110. Management server 150 may communicate with one or more base stations 120 to cause base stations 120 to control the traffic flow based on the network policy.

Management server 150 may communicate with monitoring server 140 to obtain traffic information associated with an application that is installed and/or executing on user device 110. Management server 150 may transmit an instruction, to a particular base station 120 identified by the traffic information, to increase, decrease, or neither increase or decrease a traffic flow based on the application policy associated with user device 100.

Management server 150 may communicate with monitoring server 140 to obtain traffic load information associated with traffic load conditions on one or more base stations 120. The traffic load conditions may correspond to traffic, associated with applications that are installed and/or executing on one or more user device 110, being processed by the one or more base stations 120. Management server 150 may transmit an instruction, to the one or more base stations 120, to increase, decrease, or neither increase nor decrease traffic flows based on the network policy associated with network 160.

Network 160 may include one or more wired and/or wireless networks. For example, network 160 may include a cellular network, the Public Land Mobile Network (PLMN), and/or a second generation (2G) network, a third generation (3G) network, a fourth generation (4G) network, a fifth generation (5G) network, and/or another network (e.g., a LTE network). Additionally, or alternatively, network 160 may include a wide area network (WAN), a metropolitan area network (MAN), an ad hoc network, an intranet, the Internet, and/or a combination of these or other types of networks.

Figure 2:
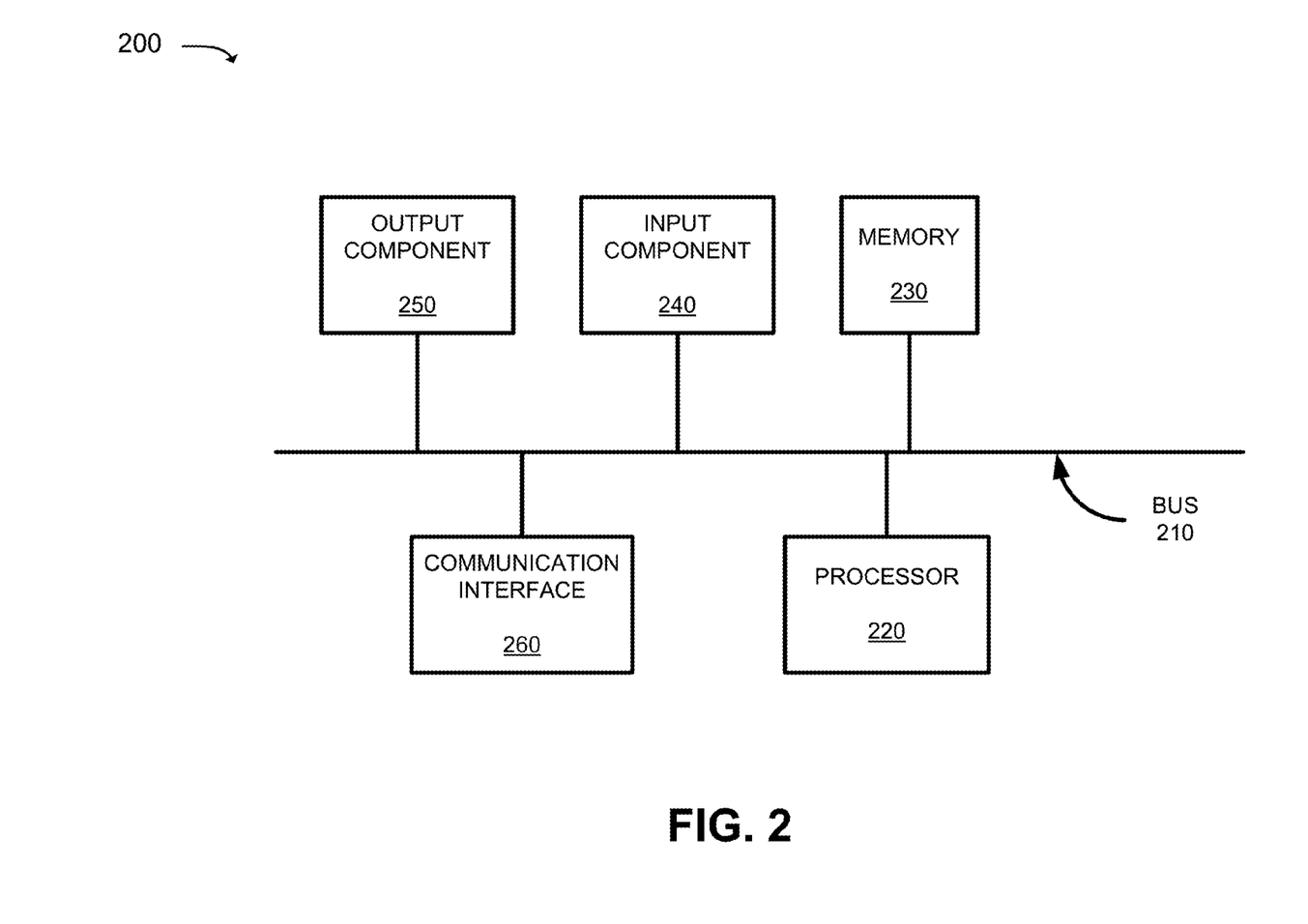
FIG. 2 is a diagram of example components of one or more of the devices depicted in FIG. 1.

FIG. 2 is a diagram of example components of a device 200 that may correspond to user device 110, application server 130, monitoring server 140, and/or management server 150. Alternatively, each of user device 110, application server 130, monitoring server 140, and/or management server 150 may include one or more devices 200 and/or one or more components of device 200. Device 200 may include a bus 210, a processor 220, a memory 230, an input component 240, an output component 250, and a communication interface 260. In another implementation, device 200 may include additional components, fewer components, different components, or differently arranged components than are shown in FIG. 2.

Bus 210 may include a path that permits communication among one or more of the components of device 200. Processor 220 may include a processor, microprocessor, or processing logic that may interpret and execute instructions. Memory 230 may include any type of dynamic storage device that may store information and instructions for execution by processor 220, and/or any type of non-volatile storage device that may store information for use by processor 220.

Input component 240 may include a mechanism that permits a user to input information to device 200, such as a keyboard, a keypad, a pointing device, a button, a switch, etc. Output component 250 may include a mechanism that outputs information to the user, such as a display, a speaker, one or more light emitting diodes (LEDs), etc. Communication interface 260 may include any transceiver-like mechanism that enables device 200 to communicate with other devices and/or systems. For example, communication interface 260 may include an Ethernet interface, an optical interface, a coaxial interface, or the like.

As will be described in detail below, device 200 may perform certain operations relating to application monitoring and control. Device 200 may perform these operations in response to processor 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Figure 3:
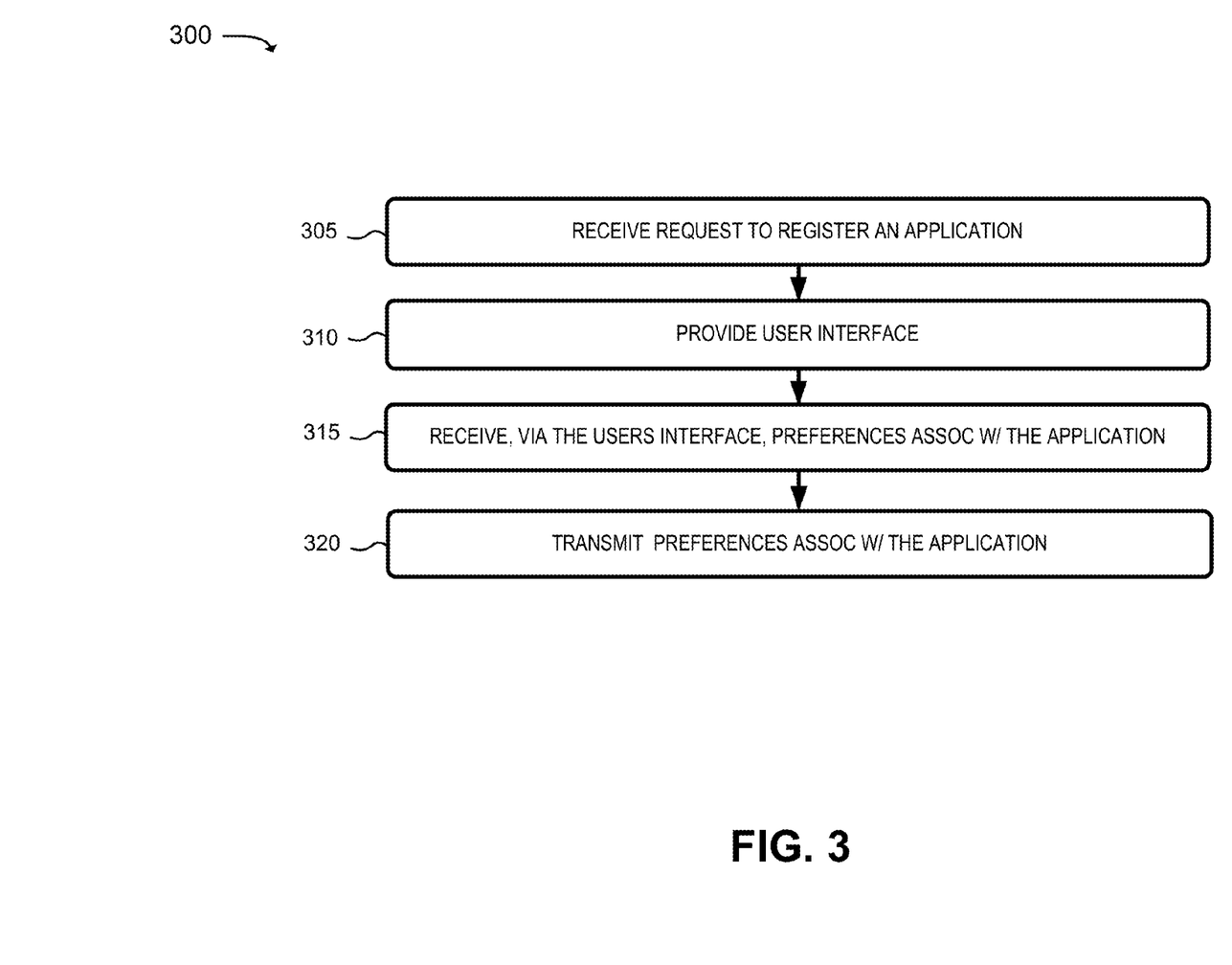
FIG. 3 is a flow chart of an example process for registering an application, according to an implementation described herein.
Figure 4:
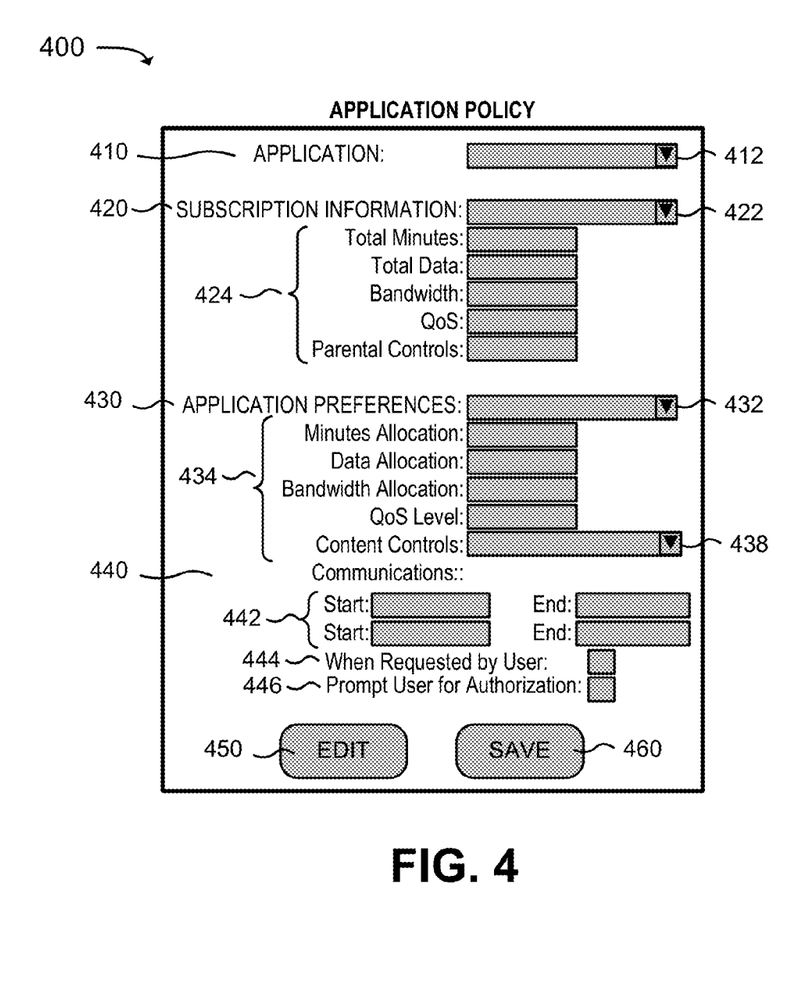
FIG. 4 is a diagram of an example user interface for setting up an application policy for monitoring and/or controlling an application.

FIG. 3 is a flow chart of an example process 300 for registering an application, according to an implementation described herein. In one implementation, process 300 may be performed by management server 150. In another implementation, some or all of process 300 may be performed by a device or collection of devices separate from, or in combination with, management server 150. FIG. 4 is a diagram of an example user interface 400 for setting up an application policy for monitoring and/or controlling an application. In the description below, all or a portion of FIG. 3 will be described with references to user interface 400 of FIG. 4.

As shown in FIG. 3, process 300 may include receiving a request to register an application (block 305) and providing a user interface (block 310). For example, user device 110 may communicate with application server 130 to obtain an application. Application server 130 may, based on the communication, transmit the application to user device 110. User device 110 may receive the application and may install the application on user device 110. User device 110 may transmit a request, to management server 150, to register the application. Management server 150 may receive the request and may, in response to the request, provide, to user device 110, a user interface (e.g., a web page), such as user interface 400 of FIG. 4, for display on user device 110.

As shown in FIG. 4, user interface 400 may include a collection of fields and/or buttons, such as, for example, an application field 410, a subscription information field 420, an application preferences field 430, an edit button 450, and a save button 460. The quantity of fields and/or buttons included within user interface 400 is provided for explanatory purposes. In another implementation, user interface 400 may include additional fields and/or buttons, fewer fields and/or buttons, different fields and/or buttons, and/or differently arranged fields and/or buttons than are shown in FIG. 4.

Application field 410 may allow a user, of user device 110, to enter information associated with a particular application that is downloaded and/or stored on user device 110. The information, associated with the particular application, may include an application identifier (e.g., an application name, an application signature, information associated with an application vendor, etc.). Additionally, or alternatively, pull-down menu button 412 may, when selected by the user, cause a list of application identifiers to be displayed. The user may select an application identifier, from the list of applications identifiers, that corresponds to the particular application, which may cause information associated with the particular application to be displayed in application field 410.

Subscription information field 420 may allow the user to enter information identifying a service plan associated with the user, such as an account number, a service plan name, etc., between the user and a service provider associated with network 160. Additionally, or alternatively, pull-down button 422 may, when selected by the user, cause user device 110 to display a list of service plans and/or account numbers associated with user device 110. The user may select a service plan, from the list of service plans. Entering the information identifying the service plan and/or selecting the service plan may cause user device 110 to retrieve, from management server 150, subscription information, associated with the service plan.

User device 110 may cause the subscription information to be pre-populated into one or more fields associated with subscription field 424. The subscription information may identify features of the service plan, such as a quantity of minutes and/or data that user device 110 is allocated during a billing period, a quantity of bandwidth permitted when communicating with network 160, a QoS to be provided to user device 110 when communicating with network 160, and/or any parental controls specified, by the user, when the subscription was set up or at some other time. The subscription information may identify a price associated with the plan and/or each feature of the plan. The QoS to be provided to user device 110 may correspond to a data rate, a forwarding priority, etc. that is permitted for traffic associated with user device 110. The QoS may pertain to services specified by the service plan and/or a service subscribed to, for example, on a one-time basis and/or for a fee, such as for video teleconference, an online game, etc. The parental controls may identify particular content that is not permitted to be received by user device 110, such as video content associated with a particular rating (e.g., a parental guidance (PG) rating, a restricted (R) rating, etc.).

Application preferences field 430 may allow the user to specify application preferences to be used in an application policy for monitoring and/or controlling the particular application identified in application field 410. For example, the user may select pull-down button 432 which may cause user device 110 to display a list of options for application preferences, such as default preferences, subscription-based preferences, custom preferences, etc.

In one example, the user may select default preferences, from the list of options, which may cause a minutes allocation, a data allocation, a bandwidth allocation, a QoS level, or content controls to be pre-populated into one or more fields associated with preferences field 434. For example, the minutes allocation field may identify a default quantity of minutes that the particular application is permitted to communicate with network 160 during a period of time (e.g., per hour, per day, per week, per billing period, etc.). The data allocation field may identify a default quantity of traffic (e.g., 100 kilobytes (KB), 10 megabytes (MB), etc.), associated with the particular application, that is permitted to be transmitted and/or received by user device 110 during the period of time. The bandwidth allocation field may identify a default quantity of bandwidth (e.g., in megahertz (MHz), gigahertz (GHz), etc.) that is permitted for traffic associated with the particular application. QoS level field may identify a default QoS level (e.g., best efforts, expedited forwarding, etc.) for traffic associated with the particular application and/or a service subscribed to by the user (e.g., such as a video teleconference service, an online game, etc.). The content controls field may identify a default setting for content, associated with the particular application, that is not permitted to be received and/or stored on user device 110. The user may, by selecting pull-down button 438, select other content controls, from a list of content controls, such as specific ratings (e.g., a PG rating, a R rating, etc.) of content that is not permitted to be received or played by user device 110. In another example, the user may select a parental control identifier that causes the content controls to be set according to the parental controls identified by subscription field 424.

If the user selects, from the list of options, the subscription-based option, then user device 110 may cause the subscription information, stored within subscription field 424 to be pre-populated into preferences field 434. The subscription-based options may have the effect of setting application preferences, for the particular application, based on subscription information identified by the service agreement.

Selecting customized preferences option, from the list of options, may permit the user, of user device 110, to enter subscription information into preferences field 434 and/or edit default preferences and/or subscription-based preferences that were pre-populated into preferences field 434.

Communications field 440 may permit the user to enter information that identifies when and/or under what conditions the application is authorized to communicate with network 160. For example, the user may enter, into time field 442, one or more time periods when the application is permitted to communicate with network 160, such as a time (e.g., hours (HH):minutes (MM) and/or some other format) when a time period starts to another time (e.g., HH:MM and/or some other format) at which the time period ends. Request field 444 may, when selected by the user, cause the application to communicate with network 160 when requested by the user. Prompt field 446 may, when selected by the user, cause user device 110 to display a notification, on user device 110, indicating that the application is communicating with network 160.

Edit button 450 may, when selected by the user, allow the user to edit application preferences associated with an application that is stored on user device 110. Save button 460 may, when selected by the user, cause application preferences, entered via user interface 400, to be saved to a memory associated with user device 110 and/or transmitted to management server 150.

As also shown in FIG. 3, process 300 may include receiving, via the user interface, preferences associated with the application (block 315) and transmitting the preferences associated with the application (block 320). For example, the user may enter information associated with the application (e.g., an application name, an application signature, etc.), obtained from application server 130, into user interface 400. Additionally, or alternatively, the user may select pull-down button 412 to select an identifier associated with the application, from a list of applications. Additionally, or alternatively, the user may enter, into subscription information field 420, information identifying a service plan associated with the user. User device 110 may receive the information identifying the service plan and may transmit, to management server 150, a request for subscription information associated with the service plan. Management server 150 may receive the request and may retrieve, from a memory associated with management server 150, subscription information relating to the service plan associated with the user. Management server 150 may transmit the subscription information to user device 110. User device 110 may receive the subscription information and may display the subscription information, via user interface 400 of FIG. 4.

The user may enter application preferences into application preferences field 430. In one example, the user may select pull-down button 432 and may select the default option from a list of options displayed via user interface 400 of FIG. 4. User device 110 may, as a result of the selection of the default option, display default application preferences via preferences field 434. In another example, the user may select, from the list of options, the subscription-based option, which may cause all or a portion of the subscription information to be displayed via preferences field 434. The user may edit one or more of the default preferences and/or subscription-based preferences that were displayed via preferences field 434. The user may enter, via time field 442, one or more time periods when the application is authorized to communicate with network 160 (e.g., from 12:01 AM to 6:00 AM, etc.) and/or may indicate that a notification is to be displayed, on user device 110, when the application is communicating with network 160. The user may select save button 460, which may cause user device 110 to save the application preferences associated with the application.

Additionally, or alternatively, user device 110 may transmit, to management server 150, the application preferences. Management server 150 may receive the application preferences, associated with user device 110, and may store the application preferences, as an application policy, in a memory associated with management server 150.

Management server 150 may also, or alternatively, transmit a client application to user device 110 as a result of registering the application and/or receiving the application preferences associated with user device 110. The client device may allow communication and/or resource usage (e.g., data usage, bandwidth usage, etc.) associated with the application to be tracked by user device 110. The client application may also, or alternatively, include an application programming interface (API) that allows user device 110 to communicate with management server 150 so that resource usage, by the application, can be reported to management server 150. User device 110 may receive the client application and may install the client application on user device 110.

Figure 5:
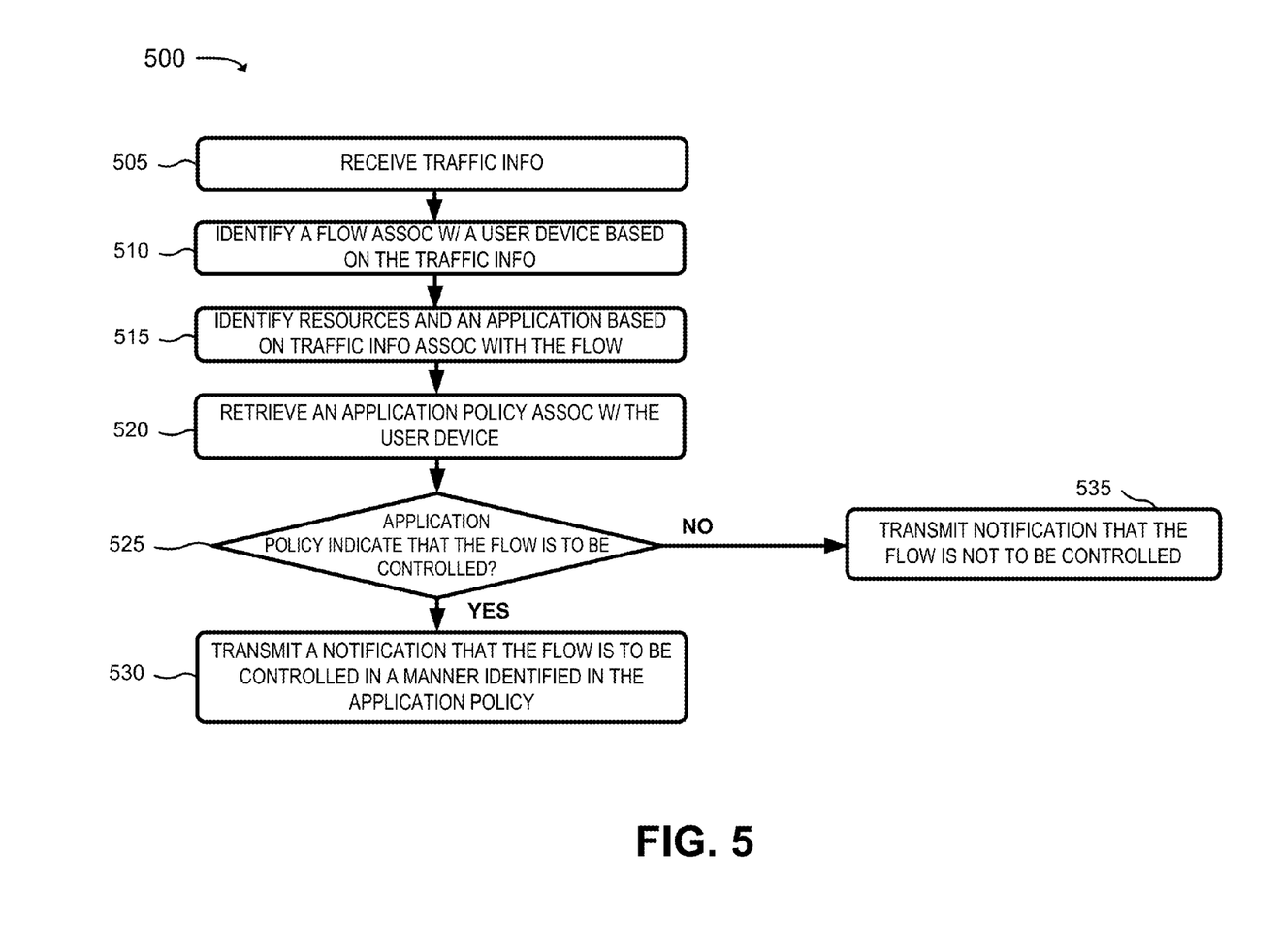
FIG. 5 is a flow chart of an example process for monitoring and/or controlling an application, installed on a user device, based on an application policy.

FIG. 5 is a flow chart of an example process 500 for monitoring and/or controlling an application, installed on a user device, based on an application policy. In one implementation, process 500 may be performed by management server 150. In another implementation, some or all of process 500 may be performed by a device or collection of devices separate from, or in combination with, management server 150.

As shown in FIG. 5, process 500 may include receiving traffic information (block 505) and identifying a flow associated with a user device based on the traffic information (block 510). For example, monitoring server 140 may monitor traffic being transported via base station 120. Monitoring server 140 may detect packets within traffic flows associated with user devices 110 that are being served by base station 120. Monitoring server 140 may identify data rates, bandwidth utilization, and/or a quantity of throughput (e.g., a quantity of data within a time period) associated with each of the traffic flows. Monitoring server 140 may also, or alternatively, analyze the packets and/or obtain information from the packets (e.g., from packet payloads, headers, trailers, labels, etc.) within each of the traffic flows. The information may identify addresses (e.g., a source address, a destination address, etc.) associated with the traffic flows, applications and/or services associated with the traffic flows (e.g., based on an application name, an application signature, an access point name (APN), a packet data network (PDN) identifier, etc.), traffic types (e.g., video, images, message traffic, etc.) associated with the traffic flows, information associated with content within the traffic flows (e.g., movies, trailers, ratings, etc.), levels of QoS to be used to process the flows, etc. Monitoring server 140 may transmit, to management server 150 and as traffic information, the information obtained from the packets. Management server 150 may receive the traffic information and may identify, within the traffic information, a traffic flow associated with user device 110 based on a source address (e.g., an IP address, a MAC address, etc.), destination address (e.g., an IP address, a MAC address, etc.), etc. associated with user device 110.

Process 500 may also include identifying resources and an application based on traffic information associated with the flow (block 515) and retrieving an application policy associated with the user device (block 520). For example, management server 150 may analyze traffic information, associated with the flow, to identify an application associated with the traffic flow based on an application identifier (e.g., an application name, an application signature, etc.). Management server 150 may also, or alternatively, analyze the traffic information associated with the flow to identify resources associated with the traffic flow (e.g., bandwidth, data rate, a quantity of data associated with the traffic flow, etc.) and/or information associated with content included within the flow (e.g., data content, an image, video content, ratings information, etc.), etc.

Management server 150 may retrieve, from a memory associated with management server 150, an application policy, associated with user device 110, that corresponds to the identified application.

As shown in FIG. 5, if the application policy indicates that the flow is to be controlled (block 525—YES), then process 500 may include transmitting a notification that the flow is to be controlled in a manner identified in the application policy (block 530). For example, management server 150 may determine whether an amount of resources, associated with the flow, is greater than an amount of resources authorized by the application policy. Management server 150 may, for example, determine whether an amount of bandwidth and/or a data rate associated with the flow is greater than an amount of bandwidth and/or a data rate identified by the application policy. Based on a determination that the amount of bandwidth and/or the data rate, associated with the flow, is greater than the amount of bandwidth and/or the data rate identified in the application policy, management server 150 may transmit a notification, to base station 120 via which the flow is being transported, to control the flow. Base station 120 may receive the notification and may control the flow by decreasing the amount of bandwidth and/or the data rate to a level that is less than an amount identified by the application policy. Additionally, or alternatively, base station 120 may process the flow by decreasing a level of QoS associated with the flow. The decreased QoS may correspond to a lower forwarding priority (e.g., from expedited forwarding to assured forwarding; from assured forwarding to best efforts, etc.), a decreased amount of bandwidth, etc.

Additionally, or alternatively, management server 150 may determine whether the flow is authorized, by the application policy, based on a time period identified in the application policy. For example, management server 150 may, based on the application policy, identify a time period during which a flow, associated with the application, is authorized to be transmitted and/or received from user device 110. Based on a determination that a current time is within the time period, management server 150 may transmit a notification to base station 120 that indicates that the flow is not authorized. Base station 120 may receive the notification and may drop packets associated with the flow, may ignore the packets associated with the flow, or may otherwise terminate the flow.

Additionally, or alternatively, management server 150 may determine whether content, associated with the flow, is authorized by the application policy, based on a content control policy identified in the application policy. For example, management server 150 may, based on the application policy, identify whether the content control policy permits a particular rating of content (e.g., a PG rating, an R rating, etc.), associated with the flow, to be received by user device 110. Based on a determination that the content, associated with the flow, is not permitted by the application policy, management server 150 may transmit a notification to base station 120 that indicates that the content, associated with the flow, is not authorized. Base station 120 may receive the notification and may drop packets associated with the flow, may ignore the packets associated with the flow, or may otherwise terminate the flow.

Additionally, or alternatively, management server 150 may determine whether an amount of data associated with the flow, is likely to cause an amount of data, used over a period of time (e.g., per day, per week, per billing period, etc.), to become greater than a threshold specified by the application policy. Based on a determination that the amount of data associated with the flow, is likely to cause the amount of data, used over the period of time, to become greater than the threshold specified by the application policy, management server 150 may transmit a notification, to base station 120, that indicates that the flow is not authorized. Base station 120 may receive the notification and may drop packets associated with the flow, may ignore the packets associated with the flow, or may otherwise terminate the flow.

Additionally, or alternatively, management server 150 may transmit, via base station 120, a notification to user device 110 that indicates that the flow, with which the application is associated, is being controlled based on one or more of the examples described above. User device 110 may receive the notification and may display the notification on user device 110.

In another example, management server 150 may transmit an instruction, to user device 110, indicating that the flow is to be controlled. In one example, the instruction may indicate, as described above, that the flow is using an amount of resources that are greater than the amount of resources specified in the application policy. In this example, user device 110 may receive the instruction and a client application, associated with user device 110, may cause a data rate and/or bandwidth to decrease to a level that is less than a level identified by the application policy. Additionally, or alternatively, an instruction may, as described above, indicate that the flow is not authorized by the application policy (e.g., based on a time period, unauthorized content, based on an amount of data being used, etc.). In this example, user device 110 may receive the notification and the client application may cause the application to stop executing and/or to stop communicating with base station 120.

As shown in FIG. 5, if application policy indicates that the flow is not to be controlled (block 525—NO), then process 500 may include transmitting a notification that the flow is not to be controlled (block 535). For example, management server 150 may determine that an amount of bandwidth and/or a data rate associated with the flow is not greater than an amount of bandwidth and/or a data rate identified in the application policy. Based on the determination that the amount of bandwidth and/or the data rate, associated with the flow, is not greater than the amount of bandwidth and/or the data rate identified in the application policy, management server 150 may transmit a notification, to base station 120 via which the flow is being transported, indicating the flow is to be processed as a normal flow. Base station 120 may receive the notification and may not control the flow and/or may process the flow as a normal flow.

Additionally, or alternatively, management server 150 may determine that the flow is being transmitted during at a time that is within a period of time that is authorized by the application policy. Based on the determination that the flow is being transmitted during an authorized time period, management server 150 may, in a manner similar to that described above, transmit a notification, to base station 120, indicating the flow is to be processed as a normal flow.

Additionally, or alternatively, management server 150 may determine that a particular rating of content (e.g., a PG rating, an R rating, etc.), associated with the flow, is permitted by the application policy. Based on a determination that the content, associated with the flow, is permitted by the application policy, management server 150 may, in a manner similar to that described above, transmit a notification, to base station 120, indicating the flow is to be processed as a normal flow.

Additionally, or alternatively, management server 150 may determine that an amount of data associated with the flow, is not likely to cause an amount of data, used over a period of time (e.g., per day, per week, per billing period, etc.), to become greater than a threshold specified by the application policy. Based on a determination that the amount of data associated with the flow, is not likely to cause the amount of data, used over the period of time, to become greater than the threshold, management server 150 may, in a manner similar to that described above, transmit a notification, to base station 120, indicating the flow is to be processed as a normal flow.

Figure 6:
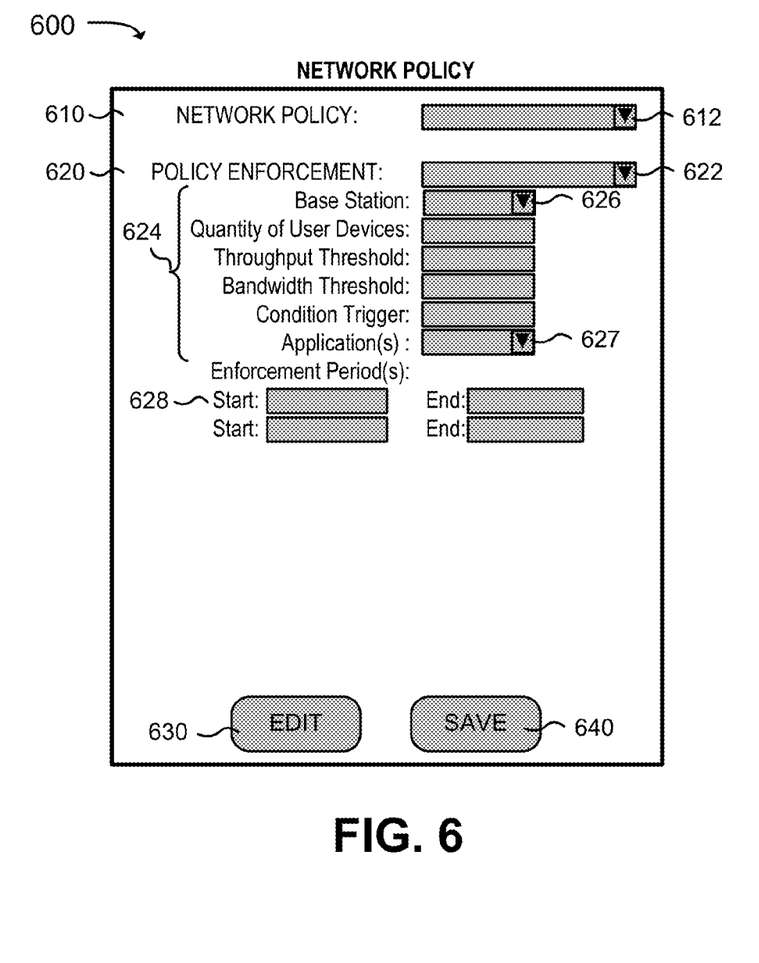
FIG. 6 is diagram of an example user interface for setting up a network policy for monitoring and/or controlling applications installed on user devices depicted in FIG. 1.

FIG. 6 is diagram of an example user interface 600 for setting up a network policy for monitoring and/or controlling applications installed on one or more user devices 110. User interface 600 may be displayed on a display device associated with management server 150. As shown in FIG. 6, user interface 600 may include a collection of fields and/or buttons, such as a network policy field 610, a network preferences field 620, an edit button 630, and a save button 640. The quantity of fields and/or buttons included within user interface 600 is provided for explanatory purposes. In another implementation, user interface 600 may include additional fields and/or buttons, fewer fields and/or buttons, different fields and/or buttons, and/or differently arranged fields and/or buttons than are shown in FIG. 6.

Network policy field 610 may allow an operator, of management server 150, to enter information associated with a network policy, such as a network policy identifier, a network policy name, etc. Pull-down button 612 may, when selected by the operator, cause a list of network policy identifiers, associated with existing network policies, to be displayed via user interface 600. The operator may select one of the network policy identifiers, associated with an existing network policy that the operator desires to edit, which may cause management server 150 to pre-populate network preferences field 620 with network preferences associated with the existing network policy.

Network preferences field 620 may allow the operator to specify network policy preferences associated with a network policy entered into network policy field 610. Pull-down button 622 may, when selected by the operator, cause a list of options to be displayed, such as a default preferences option, custom preferences option, and/or some other option. If the operator selects the default preferences option, management server 150 may cause default network preferences to be displayed via preferences fields 624. If the operator selects the custom preferences option, then the operator may enter one or more values into preferences fields 624 to specify preferences for the network policy identified in network policy field 610.

Preferences field 624 may permit the operator to enter information associated with a particular base station 120 (e.g., a device identifier, etc.) to which the network policy applies. Additionally, or alternatively, the operator may select the particular base station 120 from a list of base station identifiers when the user selects pull-down button 626. Preferences field 624 may permit the operator to enter a value associated with a quantity of user devices 110 that are permitted to be served by the particular base station 120. Preferences field 624 may permit the operator to enter an amount of throughput (e.g., a data rate, an amount of data to be processed within a period of time, an amount of concurrent flows, etc.) permitted for the particular base station 120. In one example, the throughput may be entered as a portion of a throughput capacity (e.g., as a percentage of a throughput capacity) associated with the particular base station 120. Preferences field 624 may permit the operator to enter an amount of bandwidth permitted to be processed by the particular base station 120. In one example, the amount of bandwidth may be entered as a portion of a bandwidth capacity (e.g., as a percentage of a bandwidth capacity) associated with the particular base station 120.

Preferences field 624 may permit the operator to enter one or more condition triggers that may cause the network policy to be enforced, such as when the particular base station 120 detects congestion; determines that a quantity of delayed, dropped and/or mis-ordered packets are greater than a threshold; etc. Preferences field 624 may permit the operator to enter information that identifies one or more applications to which the network policy applies. Additionally, or alternatively, the operator may select the one or more applications from a list of applications that is displayed via user interface 600 when the operator selects pull-down button 627. Time field 628 may permit the operator to enter one or more time periods when the network policy is to be enforced on traffic being processed by the particular base station 120. The operator may, for example, enter a time (e.g., HH:MM and/or some other format) from when a time period starts and another time (e.g., HH:MM and/or some other format) at which the time period ends.

Edit button 630 may, when selected by the user, allow the user edit network preferences associated with an existing network policy identified in network policy field 610. Save button 640 may, when selected by the user, cause network preferences, entered via user interface 600, to be saved to a memory associated with management server 150.

Figure 7:
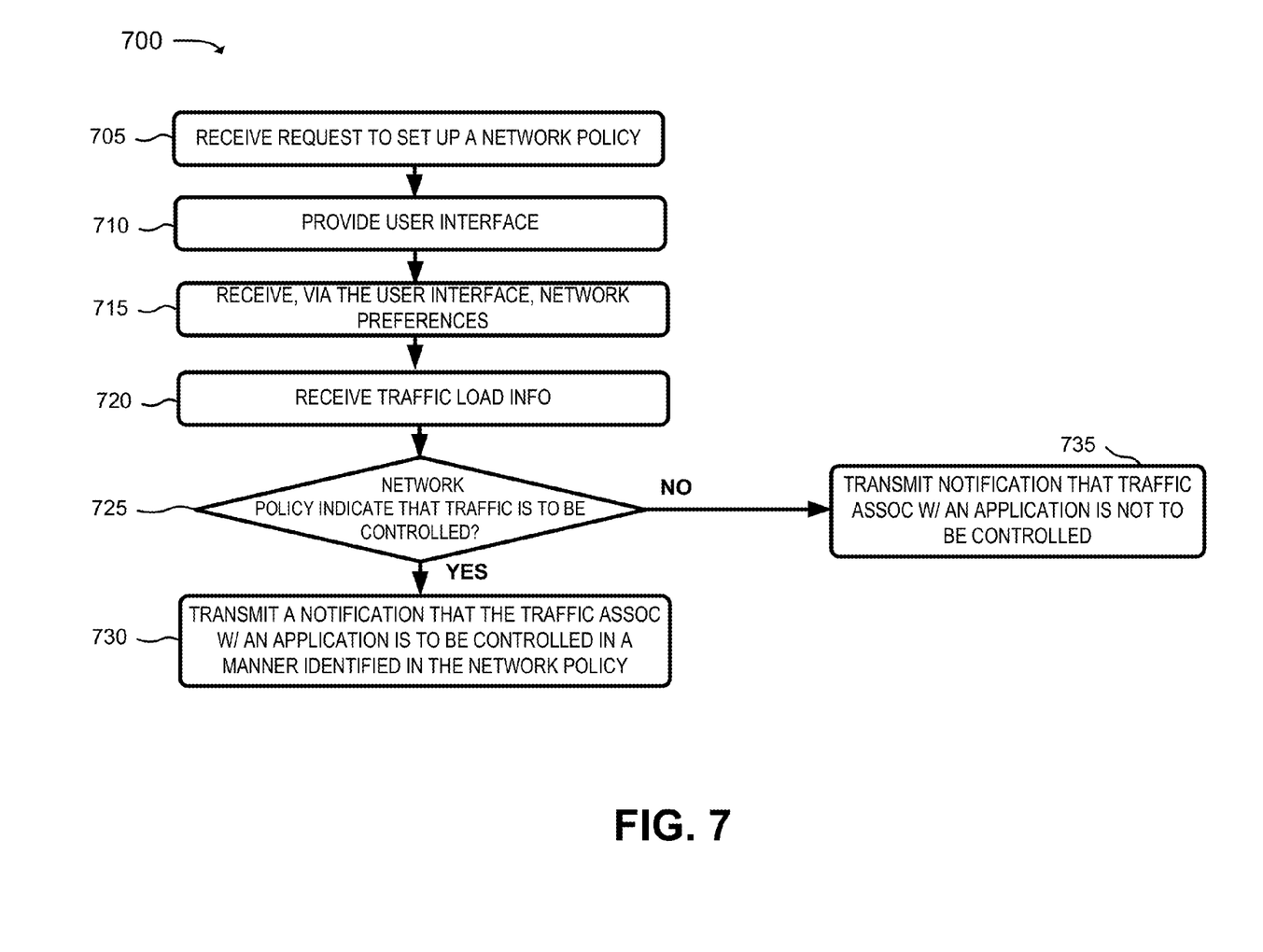
FIG. 7 is a flow chart of an example process for monitoring and/or controlling traffic, associated one or more applications, based on a network policy.

FIG. 7 is a flow chart of an example process 700 for monitoring and/or controlling traffic, associated one or more applications, based on a network policy. In one implementation, process 700 may be performed by management server 150. In another implementation, some or all of process 700 may be performed by a device or collection of devices separate from, or in combination with, management server 150.

As shown in FIG. 7, process 700 may include receiving a request to set up a network policy (block 705) and providing a user interface (block 710). For example, management server 150 may receive, from an operator of management server 150, a request to set up a network policy associated with network 160. Management server 150 may present a user interface, such as user interface 600 of FIG. 6, for display on a display device associated with management server 150.

Process 700 may also include receiving, via the user interface, network preferences (block 715). For example, the operator, of management server 150, may enter network preferences, via the user interface, on which the network policy is based. The operator may, for example, enter information that identifies the network policy (e.g., a policy name, a policy identifier, etc.) that is to be created. The operator may identify one or more base stations 120 (e.g., base stations 120-1, 120-2, etc.) to which the network policy is to apply. The operator may also, or alternatively, enter information that identifies a quantity of user devices 110 that are permitted to be served by base stations 120. The operator may also, or alternatively, enter information that identifies an amount of throughput (e.g., based on a data rate, a quantity of data to be processed over a time period, etc.) and/or bandwidth that is permitted to be processed by base stations 120. The operator may also, or alternatively, enter one or more condition triggers that, when detected by base station 120, cause management server 150 to enforce the network policy. The operator may, for example, enter information that indicates that the network policy is to be enforced when congestion is detected, when a quantity of delayed, dropped, and/or mis-ordered packets is greater than a threshold, etc. Additionally, or alternatively, the operator may enter information that identifies one or more applications to which the network policy applies. The operator may also, or alternatively, enter one or more time periods when the network policy is to be enforced, such as during peak traffic hours (e.g., starting at 08:00 AM and ending at 06:00 PM, or some other time period).

Management server 150 may receive, as the network policy and via the user interface, the network preferences entered by the operator when the operator selects a button (e.g., save button 640 of FIG. 6) associated with the user interface. Management server 150 may store the network policy in a memory associated with management server 150.

Process 700 may include receiving traffic load information (block 720). For example, monitoring server 140 may monitor traffic being processed by one or more base stations 120 to obtain traffic load information associated with each of the one or more base stations 120. Monitoring server 140 may, in a manner similar to that described with respect to block 505 of FIG. 5, analyze packets associated with the traffic to obtain the traffic load information. Additionally, or alternatively, monitoring server 140 may, in a manner similar to that described above with respect to block 505, receive traffic information, from base station 120 and/or associated with one or more user devices 110 and may associate all or a portion of the traffic information with the traffic load information. Monitoring server 140 may also, or alternatively, communicate with base stations 120 to identify a respective traffic load (e.g., respective processing bandwidth, data rate, throughput, etc., relative to a respective processing capacity) associated with each base station 120.

Monitoring server 140 may, based on monitoring the traffic, identify a respective quantity of user devices 110 being served by each of base stations 120. Monitoring server 140 may also, or alternatively, identify an amount of bandwidth and/or a data rate associated with each flow being processed by base stations 120. Monitoring server 140 may also, or alternatively, determine an aggregate bandwidth and/or data rate associated with all flows being processed by base stations 120.

Monitoring server 140 may determine whether a condition exists with respect to any of the one or more base stations 120, such as congestion, delayed packets, mis-ordered packets, dropped packets, etc. Monitoring server 140 may identify one or more user devices 110 (e.g., based on a source address, a destination address, a mobile directory number (MDN), etc.) and/or one or more applications (e.g., based on an application name, application signature, etc.) associated with one or more of the flows. In one example, monitoring server 140 may monitor traffic to obtain the traffic load information while monitoring traffic to obtain traffic information in a manner similar to that described above with respect to block 505 of FIG. 5.

Monitoring server 140 may, as a result of monitoring the traffic being processed by the one or more base stations 120, transmit traffic load information to management server 150 and management server 150 may receive the traffic load information.

As shown in FIG. 7, if a network policy indicates that traffic is to be controlled (block 725—YES), then process 700 may include sending a notification that traffic associated with an application is to be controlled in a manner identified in the network policy (block 730). For example, management server 150 may retrieve a respective network policy associated with one or more base stations 120. Management server 150 may, based on the traffic load information, determine whether a quantity of user devices 110, being served by base station 120, is greater than a threshold identified in the network policy associated with base station 120. Based on a determination that the quantity of user devices 110, being served by base station 120, is greater than the threshold, management server 150 may determine whether any applications, identified in the network policy, match an application identified in the traffic information. Based on a determination that the application, identified in the network policy matches the application identified in the traffic information, management server 150 may transmit a notification to base station 120 indicating that flows associated with the identified application are to be controlled. In one example, management server 150 may indicate, via the notification, that all or a portion of the flows, associated with the identified application, are to be terminated. Additionally, or alternatively, management server 150 may indicate that the all or a portion of the flows, associated with the identified application, are to be transferred to another base station 120. Additionally, or alternatively, management server 150 may identify with which user devices 110, the flows are associated and may indicate that all or a portion of the identified user devices 110 are to be handed off to another base station 120. Management server 150 may communicate with the other base station 120 to determine that the other base station 120 has reserve capacity to process the transferred flows and/or to serve the handed off user devices 110. Base station 120 may receive the notification and may control the flows in a manner identified in the notification.

Additionally, or alternatively, management server 150 may, based on the traffic load information, determine whether an amount of throughput and/or bandwidth, corresponding to one or more flows, associated with the application identified in the network policy, is greater than a threshold identified in the network policy. Based on a determination that the amount of throughput and/or bandwidth is greater than the threshold, management server 150 may transmit, to base station 120, a notification that all or a portion of the flows are to be controlled. The notification may, for example, indicate that a bandwidth and/or throughput are to be decreased to a level that is less than the threshold. In another example, the notification may indicate that all or a portion of the flows are to be terminated. Base stations 120 may receive the notification and may control the flows based on the notification.

Additionally, or alternatively, management server 150 may, based on the traffic load information, determine that a condition is associated with base station 120 when an amount of throughput and/or bandwidth, being processed by base station 120, is greater than a processing capacity associated with base station 120. Additionally, or alternatively, management server 150 may determine that a condition is associated with one or more flows, being processed by base station 120, when a quantity of delayed, mis-ordered, or dropped packets, associated with the one or more flows, is greater than a threshold identified in the network policy. Based on a determination that the condition exists, management server 150 may transmit, to base station 120, a notification that traffic, being processed by base station 120, is to be controlled. The notification may, for example, identify the flows that are to be controlled as flows associated with one or more applications identified in the network policy. The notification may also, or alternatively, identify a bandwidth and/or throughput to which the flows are to be reduced to remedy the congestion. The notification may also, or alternatively, identify a bandwidth and/or throughput to which the one or more flows are to be reduced to reduce the quantity of delayed, mis-ordered, and/or dropped packets. Base station 120 may receive the notification and may control the flows identified by the notification and/or in the manner identified in the notification.

In another example, management server 150 may transmit, via base station 120, an instruction, to one or more user devices 110, indicating that flows, identified in a manner similar to that described above, are to be controlled. In one example, the instruction may indicate, as described above, that flows associated with a particular application installed on user devices 110 are to be controlled. Each user device 110 may, as a result of the instruction, use a client application to cause an amount of bandwidth and/or a data rate associated with a respective flow associated with the particular application, to decrease to a level that is less than a threshold (e.g., identified in the notification or an application policy associated with the particular application). In another example, each user device 110 may cause the particular application to stop executing and/or to cease communicating with network 160.

As shown in FIG. 7, if the network policy indicates that traffic is not to be controlled (block 725—NO), then process 700 may include sending a notification that traffic, associated with an application, is not to be controlled based on the network policy (block 735). For example, management server 150 may, based on the traffic load information, determine that the quantity of user devices 110, being served by base station 120, is not greater than the threshold identified in the network policy. Based on the determination that the quantity of user devices 110 is not greater than the threshold, management server 150 may transmit a notification to base station 120 indicating that flows, associated with all or a portion of user devices 110, are to be processed as normal flows and/or are not to be controlled. Base station 120 may receive the notification and may process the flows as normal flows.

Additionally, or alternatively, management server 150 may, based on the traffic load information, determine that the amount of throughput and/or bandwidth, corresponding to one or more flows associated with the application identified in the network policy, is not greater than the threshold identified in the network policy. Based on the determination that the amount of throughput and/or bandwidth is not greater than the threshold identified in the network policy, management server 150 may transmit, to base station 120, a notification that all or a portion of the flows are to be processed as normal flows. Base station 120 may receive the notification and may process the flows as normal flows.

Additionally, or alternatively, management server 150 may, based on the traffic load information, determine that a condition is not associated with base station 120 when the amount of throughput and/or bandwidth, being processed by base station 120, is not greater than the processing capacity associated with base station 120. Additionally, or alternatively, management server 150 may determine that a condition is not associated with one or more flows, being processed by base station 120, when the quantity of delayed, mis-ordered, or dropped packets associated with the one or more flows is not greater than the threshold identified by the network policy. Based on the determination that the condition does not exist, management server 150 may transmit, to base station 120, a notification that the one or more flows is to be processed as normal flows. Base station 120 may receive the notification and may process the flows as normal flows.

A system and/or method, described herein, may allow a server device to monitor and/or control a flow associated with an application that is installed on a user device based on an application policy that is set up by a user of the user device. The server device may control the flow by causing an amount of resources, associated with the flow, to be decreased to a level that is less than a threshold identified in the application policy. The server device may control the flow by terminating the flow when the application policy does not permit the application to communicate with the network. The server device, by enforcing the application policy, may enable the user device to use the application while operating within terms and/or conditions associated with an agreement between the user and a service provider associated with the network.

A system and/or method, described herein, may allow a server device to monitor and/or control flows of traffic, associated with one or more applications installed on user devices within the network based on a network policy that is set up by an operator of the server device. The server device may control the flows by causing an amount of resources associated with the flows, to be reduced to a level identified in the network policy. The server device may control the flows by causing the flows to be terminated. Controlling the flows may allow the network to operate without becoming congested and/or may permit a QoS to be delivered to users that have subscribed to a particular QoS.

The foregoing description provides illustration and description, but is not intended to be exhaustive or to limit the implementations to the precise form disclosed. Modifications and variations are possible in light of the above teachings or may be acquired from practice of the implementations.

While series of blocks have been described with regard to FIGS. 3, 7, and 8, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Further, certain portions, described above, may be implemented as a component or logic that performs one or more functions. A component or logic, as used herein, may include hardware, such as a processor, an application-specific integrated circuit (ASIC), or a field-programmable gate array (FPGA), or a combination of hardware and software (e.g., a processor executing software).

It should be emphasized that the term "comprises/comprising," when used in this specification, is taken to specify the presence of stated features, integers, steps or components but does not preclude the presence or addition of one or more other features, integers, steps, components or groups thereof.

Even though particular combinations of features are recited in the claims and/or disclosed in the specification, these combinations are not intended to limit the disclosure of the implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential to the implementations unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
providing, by a server device and to a user device, a user interface for providing multiple options for controlling an application installed on the user device;
receiving, by the server device and from the user device, customized preferences identifying subscription-based preferences associated with the multiple options;
storing, by the server device, the customized preferences in an application policy corresponding to the application;
receiving, by the server device, traffic information,
the traffic information including data transmitted to the user device and data received from the user device during a communication session;
identifying, by the server device and based on the traffic information, the application and resources being used to process the traffic information;
obtaining, by the server device and based on identifying the application, the application policy associated with the application;
identifying, based on the application policy, an amount of resources authorized for the traffic information;
determining, by the server device, that an amount of the resources being used to process the traffic information exceeds the authorized amount of resources; and
transmitting, by the server device and based on the determination, a notification to control the traffic information to cause the amount of the resources used to process the traffic information to be reduced to a level below the authorized amount of resources.

2. The method of claim 1, further comprising:
receiving, from the user device, a request to register the application,
the user interface being provided based on the request.

3. The method of claim 1, where the subscription-based preferences identify the authorized amount of resources and a period of time during which the application is authorized to communicate with a network.

4. The method of claim 3, further comprising:
determining that a current time, at which the traffic information is received, is not within the period of time during which the application is authorized to communicate with the network; and
transmitting, based on determining that the current time is not within the period of time during which the application is authorized to communicate with the network, a notification to terminate the communication session.

5. The method of claim 1, where the identified amount of resources include at least one of:
an amount of bandwidth associated with the traffic information,
a data rate of the traffic information,
an amount of data transported during a time period, or
a forwarding priority associated with the traffic information.

6. The method of claim 1, where transmitting the notification to control the traffic information includes at least one of:
transmitting a notification to reduce an amount of bandwidth associated with the traffic information to a level that is less than a first threshold specified in the application policy;
transmitting a notification to reduce a data rate of the traffic information to a data rate that is less than a second threshold specified in the application policy;
transmitting a notification to reduce an amount of data that is transported during another time period, to an amount that is less than a third threshold specified in the application policy; or
transmitting a notification to reduce a forwarding priority, associated with the traffic information, to another forwarding priority that is lower than the forwarding priority associated with the traffic information.

7. The method of claim 1, further comprising:
receiving traffic load information associated with the traffic information,
the traffic load information identifying one or more flows, of a plurality of flows within the traffic information, that are associated with one or more applications installed on one or more user devices of a plurality of user devices being served by a base station;
obtaining a network policy, associated with the one or more applications, that identifies a quantity of user devices that are authorized to be served by the base station; and
transmitting a notification to control the one or more flows based on a determination that a quantity of the plurality of user devices is greater than the quantity of user devices that are authorized in the network policy.

8. The method of claim 7, where transmitting the notification to control the one or more flows includes:
transmitting an instruction to terminate at least one of the one or more flows associated with the one or more applications; or
transmitting an instruction to transfer, to another base station, information associated with at least one of the one or more user devices.

9. The method of claim 1, further comprising:
receiving, from a base station, traffic information, associated with another user device, that identifies that the application is installed on the other user device and identifies other resources used, by the base station, to process other traffic information associated with the application;
determining that an amount of the other resources used by the base station to process the other traffic information is greater than the authorized amount of resources; and
transmitting, to the other user device, a notification to control the other traffic information based on the determination that the amount of the other resources is greater than the authorized amount of resources,
the notification to control the other traffic information causing a reduction in the amount of the other resources to a level that is less than the authorized amount of resources.

10. A server device comprising:
a memory to:
store one or more application policies that identifies resources, associated with one or more base stations, authorized for respective traffic information associated with respective applications installed on respective user devices that are served by the one or more base stations; and one or more processors to:
provide, to the user devices, respective user interfaces for providing multiple options for controlling use of the respective applications;
receive, from the user devices, customized preferences identifying subscription-based preferences associated with the multiple options;
store, in the memory, the customized preferences in a respective application policy of the one or more application policies;
receive the respective traffic information,
the respective user devices and data received from the respective user devices during a respective communication session;
determine, based on the respective traffic information, that a first amount of resources being used, by a base station of the one or more base stations, to process one or more of the respective traffic information is greater than a second amount of resources, authorized in an application policy of the one or more application policies; and
transmit, based on the determination, an instruction to cause the first amount of resources to be reduced to a third amount of resources that is less than the second amount of resources.

11. The server device of claim 10, where the base station is at least one of:
an eNodeB device,
an evolved high rate packet data (eHRPD) device, or
a wireless access point.

12. The server device of claim 10, where the one or more processors are further to:
receive a request to set up a network policy associated with the base station;
provide, based on the request, an interface that allows respective network preferences, associated with each of the one or more applications, to be entered;
receive the respective network preferences; and
store, in the memory, the respective network preferences.

13. The server device of claim 10, where the second amount of resources identifies at least one of:
an amount of bandwidth that is permitted to be used, by the base station, to process the respective traffic information,
an amount of throughput that is permitted to be used, by the base station, to process the respective traffic information, or
a forwarding priority to be used, by the base station, to process the respective traffic information.

14. The server device of claim 10, where the one or more processors are further to:
determine that a condition is associated with traffic information, of the respective traffic information, being processed by the base station,
identify, based on a network policy, that the traffic information is to be controlled when the condition corresponds to a quantity of dropped, mis-ordered, or delayed packets that is greater than a threshold, and
transmit, to the base station, an instruction to control the traffic information when:
the traffic information is associated with one of the one or more applications, and
the traffic information indicates that a quantity of dropped, mis-ordered, or delayed packets is greater than the threshold.

15. The server device of claim 14, where the one or more processors are further to:
generate an instruction to control the traffic information to cause the base station to:
terminate the traffic information,
reduce a data rate associated with the traffic information, or
transfer the traffic information to another base station of the one or more base stations.

16. The server device of claim 10, where the one or more processors are further to:
receive, from the user devices, a plurality of requests to register the applications.

17. A non-transitory computer-readable medium storing instructions, the instructions comprising:
one or more instructions, which when executed by at least one processor, cause the at least one processor to:
provide, to a user device, a user interface for providing multiple options for controlling an application installed on the user device;
receive, from the user device, customized preferences identifying subscription-based preferences associated with the multiple options;
store the customized preferences in an application policy corresponding to the application;
receive traffic information,
the traffic information including data transmitted to the user device and data received from the user device during a communication session;
obtain, based on receiving the traffic information, the application policy,
the application policy identifying at least one of:
authorized resources for processing the traffic information, or
an authorized time period during which the traffic information is permitted to be processed;
determine if an amount of the resources used to process the traffic information is less than authorized resources; and
transmit, when at least one of the amount of resources is not less than the authorized resources or a time at which the traffic information is received is not within the authorized time period, a notification to cause the traffic information to be controlled,
the notification causing a base station to terminate the communication session or reduce the amount of resources to a level that is less than the authorized resources.

18. The non-transitory computer-readable medium of claim 17, where the instructions further include:
one or more instructions to identify, based on the traffic information, that content, associated with a rating, is included with the traffic information;
one or more instructions to determine if the application policy permits the content, associated with the rating, to be transmitted to the user device; and
one or more instructions to transmit, to the base station and when the application policy indicates that the content is not authorized to be transmitted to the user device, a notification that the traffic information is not to be transmitted to the user device.

19. The non-transitory computer-readable medium of claim 17, where the instructions further include:
one or more instructions to determine that the base station has become congested;
one or more instructions to obtain, based on the determination that the base station has become congested, a network policy associated with the base station,
the network policy identifying at least one of:

one or more applications installed on user devices that are served by the base station, one or more types of conditions that cause the network policy to be enforced, or resources that are permitted to be used to process traffic information associated with the applications;

one or more instructions to determine that the network policy is to be enforced when congestion is included among the one or more types of conditions; and one or more instructions to enforce the network policy by causing the base station to reduce resources, used to process respective traffic information, associated with at least one of the one or more applications, to a level that is permitted by the network policy.

20. The non-transitory computer-readable medium of claim 19, where the one or more instructions to enforce the network policy include:

one or more instructions to transmit, to the base station, an instruction to at least one of:

terminate the respective traffic information to cause a quantity of the user devices to be reduced to a quantity that is less than a threshold identified in the network policy, or transfer the respective traffic information to another base station to cause the quantity of the user devices to be reduced to the quantity that is less than the threshold identified in the network policy.

21. The non-transitory computer-readable medium of claim 19, where the one or more instructions to enforce the network policy include:

one or more instructions to transmit, to the base station, an instruction to at least one of:

reduce an amount of bandwidth, associated with the respective traffic information, to a level that is less than a first threshold identified in the network policy, reduce a data rate, associated with the respective traffic information, to a level that is less than a second threshold identified in the network policy, or reduce a level of quality of service, associated with the respective traffic information, to another level that is less than a third threshold identified in the network policy.

* * * * *